United States Patent
Su

(10) Patent No.: US 7,487,279 B2
(45) Date of Patent: Feb. 3, 2009

(54) ACHIEVING BOTH LOCKING FAIRNESS AND LOCKING PERFORMANCE WITH SPIN LOCKS

(75) Inventor: Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 11/625,842

(22) Filed: Jan. 23, 2007

(65) Prior Publication Data

US 2008/0177955 A1    Jul. 24, 2008

(51) Int. Cl.
*G06F 12/00* (2006.01)
(52) U.S. Cl. .................. 710/200; 710/240; 710/244
(58) Field of Classification Search .......... 710/200, 710/240, 244; 711/152, 163
See application file for complete search history.

(56) References Cited

U.S. PATENT DOCUMENTS

| | | | | |
|---|---|---|---|---|
| 5,442,763 A * | 8/1995 | Bartfai et al. | ............... | 711/145 |
| 6,260,117 B1 * | 7/2001 | Freerksen et al. | ........... | 711/146 |
| 6,275,907 B1 * | 8/2001 | Baumgartner et al. | ....... | 711/143 |
| 6,779,090 B2 * | 8/2004 | McKenney et al. | ......... | 711/152 |
| 6,792,497 B1 * | 9/2004 | Gold et al. | .................. | 710/317 |
| 7,246,187 B1 * | 7/2007 | Ezra et al. | ................... | 710/200 |

OTHER PUBLICATIONS

Definition of Cache Coherency from Wikipedia, undated.*
T.E. Anderson, The Performance Implications of Spin Lock Alternatives for Shared-Memory Multiprocessors. IEEE Transaction on Parallel and Distributed Systems, 1(1):6-16, Jan. 1990.
J.M. Mellor-Crummey and M.L. Scott, Algorithms for Scalable Synchronization on Shared-Memory Multiprocessors. ACM Transactions on Computer Systems, 9(1):21-65, Feb. 1991.
B.-H. Lim and A. Agarwal, Reactive Synchronization Algorithms for Multiprocessors. ASPLOS 1994.
S. Swaminathan, J. Stultz, J.F. Vogel, P. McKenney, Fairlocks—A High Performance Fair Locking Scheme. 14th International Conference on Parallel and Distributed Computing and Systems, Nov. 2002.

* cited by examiner

*Primary Examiner*—Khanh Dang
(74) *Attorney, Agent, or Firm*—Michael J. Buchenhorner; Douglas W. Cameron

(57) ABSTRACT

A method for implementing a spin lock in a system including a plurality of processing nodes, each node including at least one processor and a cache memory, the method including steps of: acquiring exclusivity to the cache memory; checking the availability of the spin lock; setting the spin lock to logical one if the spin lock is available; setting the spin lock to logical zero once processing is complete; and explicitly yielding the cache memory exclusivity. Yielding the cache memory exclusivity includes instructing the cache coherent hardware to mark the cache memory as non-exclusive. The cache memory is typically called level two cache.

16 Claims, 4 Drawing Sheets

ACHIEVING BOTH LOCKING FAIRNESS AND LOCKING PERFORMANCE WITH SPIN LOCKS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of optimizing lock operations and more particularly relates to the field of spin locks.

BACKGROUND OF THE INVENTION

Computer systems can suffer severe performance degradation as a result of high lock contention. Lock operations are associated with software locks which are used to ensure that only one process at a time can access a shared resource, such as a region of memory. The act of accessing the shared resource is also referred to as entering the critical region. Most shared-memory architectures, such as SMP (Symmetric Multi-Processor) and NUMA (Non-Uniform Memory Access) architectures also provide hardware support for making mutually exclusive accesses to shared cache data. This hardware support is known as a cache coherent mechanism. Locks are fundamental software synchronization primitives for controlling concurrent access to shared data. The performance degradation occurs under high lock contention because only one CPU can acquire the lock and do useful work while all other CPUs must wait for the lock to be released.

Spin locks are a very simple and, in the right context, efficient method of synchronizing access to shared resources. A "spin lock" is so named because if a spin lock is not available, the caller busy-waits (or "spins") until the lock becomes available. This is called "software spin-waiting." The algorithm for spin-waiting is very simple. Each process must check a shared lock variable. When a shared resource is required, a process calls lock( ) to test and set the variable and when the resource is ready to be released, a process calls unlock( ) to clear the variable. The lock( ) function will cause a waiting process to loop until the resource is available. The availability of the resource is defined by the value of the shared lock variable. Conventionally, if the value of this variable is zero, then the resource is available, otherwise it is in use by another process. When the resource is locked, the shared variable holds a non-zero value.

Systems employing locks typically require that a given process perform an atomic operation to obtain access to a shared data structure. In other words, another process cannot access the lock between the test and set portion of the atomic operation. The test-and-set operation is performed to determine whether a lock variable associated with the shared data structure is cleared and to atomically set the lock variable. That is, the test allows the process to determine whether the shared data structure is free of a lock by another process, and the set operation allows the process to acquire the lock if the lock variable is cleared.

The key to lock design is to achieve both fairness at high contention and performance at low contention. Fairness in the context of lock design is defined as equalizing the ability of all contenders vying for a lock to acquire that lock, regardless of the contenders' position and/or relationship to the existing lock holder. Existing locking mechanisms have achieved fairness or high performance, but not both. Specifically, three of the most widely used lock designs are: spin locks, queue locks, adaptive locks, and fairlocks.

Spin locks are widely used due to their high performance at low contention. [See T. E. Anderson., *The Performance Implications of Spin Lock Alternatives for Shared-Memory Multiprocessors*. IEEE Transaction on Parallel and Distributed Systems, 1(1):6-16, January 1990] In a spin lock implementation, if the test of the lock variable indicates that another process has acquired the lock to the shared memory region, the requesters for the lock initiate a loop wherein the lock variable is continuously read until the lock variable is cleared, at which time the waiting processes reinitiate the atomic test-and-set operation. In NUMA architectures, spin locks can create locking starvation due to the locking unfairness created by the large memory access latency difference across nodes. Because a CPU can access a spin lock in its local cache much faster than a CPU can access the same spin lock from another node. Therefore, the CPU that is on the same node where the spin lock is located has a much higher chance of acquiring the lock than a CPU that resides on another node.

Queue locks [see J. M. Mellor-Crummey and M. L. Scott, *Algorithms for Scalable Synchronization on Shared-Memory Multiprocessors*. ACM Transactions on Computer Systems, 9(1):21-65, February 1991] and adaptive locks [see B.-H. Lim and A. Agarwal, *Reactive Synchronization Algorithms for Multiprocessors*. ASPLOS 1994] avoid unfairness under high contention by introducing complex lock data structures and algorithms to keep track of the usage and ownership of the lock. However, these data structures and algorithms also introduce additional locking latency overhead, therefore sacrificing locking performance at low contention.

Fairlocks provide fairness at high contention by using a bit mask to keep track of contending CPUs and enforce fairness by asking the lock-releasing CPU to explicitly yield the lock to other contending CPUs. [see S. Swaminathan, J. Stultz, J. F. Vogel, P. McKenney, Fairlocks—*A High Performance Fair Locking Scheme*. 14th International Conference on Parallel and Distributed Computing and Systems, November 2002] Due to the simpler data structure and algorithm used, fairlocks have better locking performance than queue locks and adaptive locks at low contention. But their locking performance at low contention is still worse than that of spin locks.

There is a need for an improved lock mechanism that overcomes the shortcomings of the prior art.

SUMMARY OF THE INVENTION

Briefly, according to an embodiment of the invention, a method of implementing a spin lock in a system including a plurality of processing nodes, each node including at least one processor and a cache memory, includes steps of: acquiring exclusivity to the cache memory; checking the availability of the spin lock; setting the spin lock to logical one if the spin lock is available; then setting the spin lock to logical zero once processing is complete; and explicitly yielding the cache memory exclusivity. Yielding the cache memory exclusivity includes instructing the cache coherent hardware to mark the cache memory as non-exclusive. The cache memory, typically called a Level 2 (L2) cache, is physically divided among multiple processing nodes but logically shared as a single addressable unit among the multiple processing nodes.

BRIEF DESCRIPTION OF THE DRAWINGS

The features believed characteristic of the invention are set forth in the appended claims. The invention itself, however, as well as an example of its preferred mode of use, further objectives and advantages thereof, will best be understood by reference to the following detailed description of an illustrative embodiment when read in conjunction with the accompanying drawings, wherein:

Figure 1:
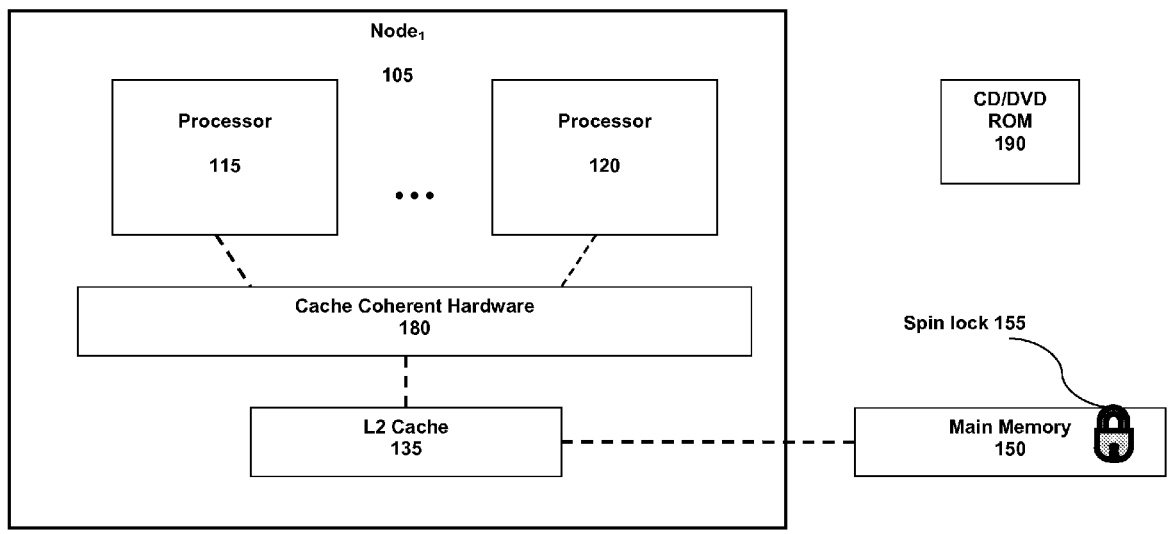
FIG. 1 is a simplified block diagram of a computer system configured to operate a spin lock according to both the known art and an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION OF THE PREFERRED EMBODIMENTS

We describe a method for providing locking fairness at high contention without sacrificing locking performance at low contention for large-scale, Non-Uniform Memory Access (NUMA) distributed shared memory multiprocessor architectures, according to an embodiment of the invention. This is achieved through a key aspect of the invention:

A "cooperative" feature to the existing spin lock mechanism provides statistical locking fairness at high contention without any additional lock data structure and algorithm; therefore retaining its locking performance at low contention. It is more beneficial to provide statistical locking fairness rather than the absolute locking fairness targeted by existing locking mechanisms. Statistical fairness means that all of the lock contenders have an equal chance of acquiring a lock, while absolute fairness means that all of the lock contenders have an equal number of times a lock is actually acquired. While statistical fairness is a weaker condition than absolute fairness, statistical fairness is adequate for applications in all practical purposes and will optimize performance by reducing locking overhead. Statistical fairness is considered a weaker condition because it does not guarantee that at any given instance of time each lock contender acquires the lock exactly the same number of times. Rather, it only provides that each lock contender has an equal chance of acquiring the lock. Therefore, at any given instance of time, when one looks at how many times each lock contender has acquired the lock, the numbers may not be all the same. But as time goes to infinite, each lock contender will acquire the lock the same number of times.

The present invention addresses the problem of providing both locking performance and locking fairness at the same time in Non-Uniform Memory Access (NUMA) distributed shared memory multiprocessor architectures. The "cooperative" feature to the existing spin lock mechanism enables locking fairness under high contention without sacrificing locking performance under low contention. The cooperative feature does not require any change to the current spin lock usage interface and semantics; therefore it does not require any change to the applications utilizing spin locks either.

A lock recoverability mechanism can be used for those uncommon situations where the processing aborts before the lock is released in order to make it available to another process.

For simplicity, a memory address is used as an example of a resource associated with a lock and a CPU is used as an example of a device seeking the resource. It should be noted that other devices and other resources, such as input/output interfaces, where locks are applicable, can also benefit from the embodiment according to the present invention and fall within the scope of the invention.

Target Environment.

Referring now in specific detail to the drawings, and particularly to FIG. 1, there is shown a block diagram of an information handling system 100 configured to operate a locking scheme, according to both the known art and an embodiment of the invention. The system 100 includes multiple multi-processor nodes, but only one node, Node$_1$ 105, is shown here. The Node$_1$ 105 includes multiple processors, two of which are shown: CPU 115 and CPU 120. The processors 115 and 120 can be micro-processors or a plurality of microprocessors. The Main Memory 150 represents either a random-access memory or mass storage, such as a magnetic media mass storage device such as a hard disk drive. It can be volatile or non-volatile. Node$_1$ 105 also includes Level 2 cache memory 135. Cache coherent hardware 180 is shared by each processor of Node$_1$ 105.

According to another embodiment of the invention, a computer readable medium, such as a CDROM or DVDROM 190 can include program instructions for operating a portion of the system 100 according to the invention. What has been shown and discussed is a highly-simplified depiction of a programmable computer apparatus. Those skilled in the art will appreciate that other low-level components and connections are required in any practical application of a computer apparatus.

Figure 2:
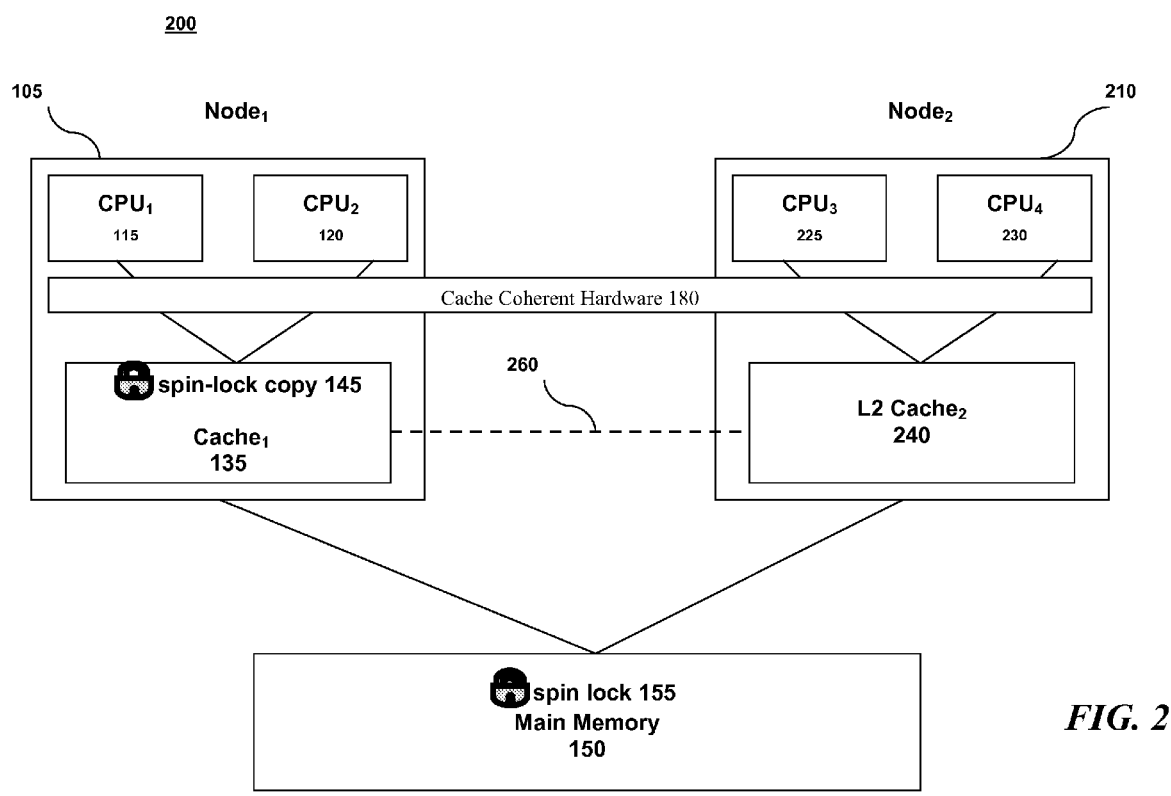
FIG. 2 is a diagram illustrating an exemplary locking function in NUMA distributed shared memory architecture, according to both the known art and an embodiment of the present invention.

Referring now to FIG. 2 there is illustrated a diagram of an exemplary NUMA distributed shared memory multiprocessor architecture. The target environment for the present invention is a NUMA distributed shared memory multiprocessor architecture (referred to simply as a NUMA architecture hereafter). Therefore, FIG. 2 is provided as an example to illustrate the architecture and its memory access characteristics. No limitation on the environments in which the present invention may be utilized is intended or implied by the description and depictions of FIG. 2.

With reference now to FIG. 2 there is shown a pictorial representation of a NUMA architecture with two affinity nodes, Node$_1$ 105 and Node$_2$ 210, each node having two CPUs. CPU$_1$ 115 and CPU$_2$ 120 reside in Node$_1$ and CPU$_3$ 225 and CPU$_4$ 230 reside in Node$_2$. In practice, the number of nodes and the number of CPUs per node can be any number combination; the only restriction being the hardware implementation. All CPUs on all nodes share the same Main Memory 150 represented by a single address space. Each CPU within a node shares the same L2 Cache memory. L2

Cache is Level 2 cache, or cache memory that is external to a microprocessor. L2 Cache memory resides on a separate chip from the microprocessor chip, as opposed to Level 1 cache which resides on the microprocessor chip. An L2 Cache is necessary in order for multiple CPUs to share cache memory.

When a CPU seeks a data item from memory it follows a logical progression of searching for the data item in the memory hierarchy, with access latency increasing progressively. First, the CPU determines if the data item is available in its private Level 1 (L1) Cache (not shown in the figure since it is irrelevant to this invention). If the data item is not available in the private L1 Cache, the local L2 Cache is checked. If the data item is not available in the local L2 Cache, the L2 Caches of all other nodes within the same network are checked. Finally, the data item is fetched from the Main Memory 150 if it is not available from any of the L2 Caches. The important memory access characteristics to bear in mind are: a) accessing local L2 Cache is typically the fastest (again, ignoring L1 Cache), most direct path to the desired item; b) accessing remote L2 Cache is typically two to three times slower than accessing local L2 Cache; and c) accessing Main Memory 150 is typically two to three times slower than accessing remote L2 Cache.

Locking Unfairness

Figure 3:
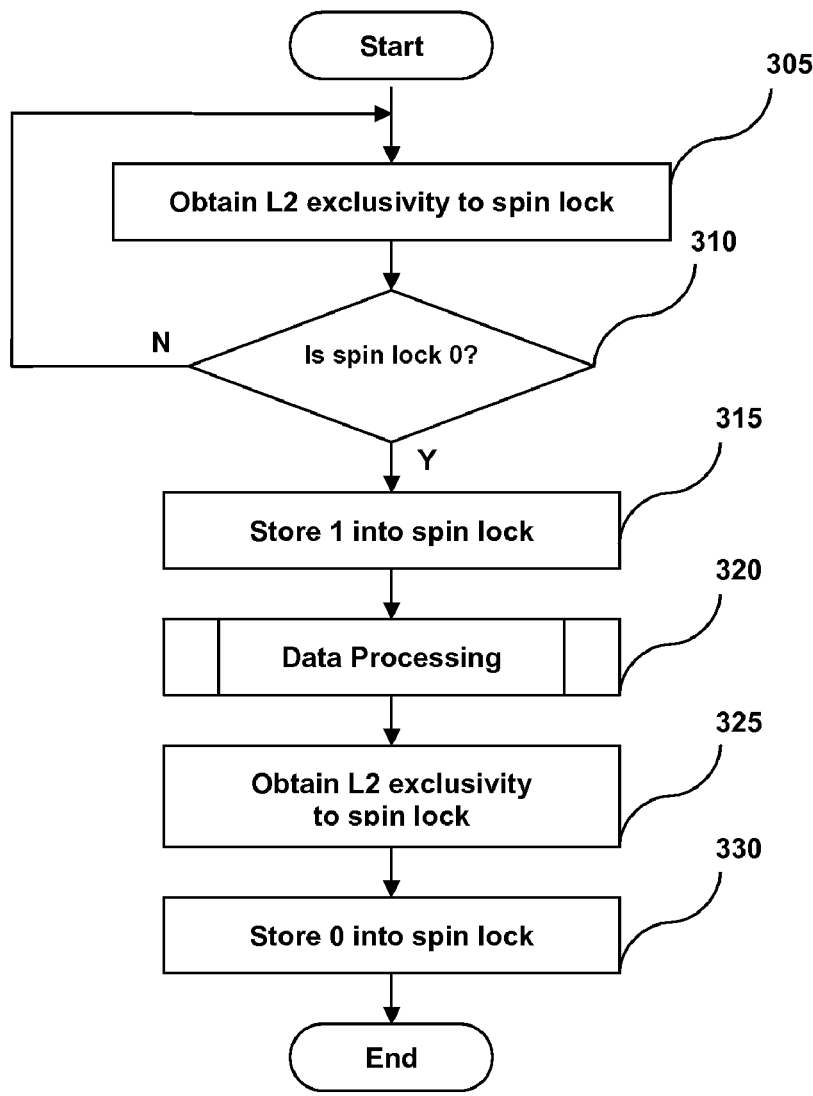
FIG. 3 is a flow chart depicting a typical procedure of using spin locks, according to the known art.

To understand why current spin locks create locking unfairness in NUMA architectures as depicted in FIG. 2, we refer now to FIG. 3, which details a standard procedure using a spin lock. In order to acquire a spin lock, a CPU typically uses a processing loop (software "spin waiting") to test whether the spin lock 155 has been successfully acquired. This test begins at step 305 when a CPU obtains L2 Cache exclusivity to the spin lock 155. In order to attempt acquiring a spin lock 155, a CPU must first gain exclusivity to the cache holding the spin lock 155. Acquiring cache exclusivity is part of a known cache coherent protocol. The cache coherent protocol involves finding out which CPU is currently holding the exclusivity to the cache and informing the CPU so that the cache coherent hardware 180 can write the cache back to main memory if the value in the cache has changed. The holding CPU then releases its exclusivity to the cache so that another requesting CPU can obtain exclusivity to the cache.

Once the cache exclusivity is obtained, the spin lock 155 is tested to check its value in step 310. If the spin lock 155 is not equal to zero, this indicates that the spin lock 155 is locked by another processor. Since the CPU cannot acquire a spin lock with a non-zero value, the processing loops back to step 305 and the CPU tries to acquire the spin lock 155 again. This loop will continue until the spin lock 155 has been released by the holding CPU. Releasing a spin lock is accomplished by writing the value of "zero" into the spin lock. Once the value has been set to zero, this indicates that the holding CPU has released the spin lock 155. It is now therefore available for the acquiring CPU to write the value "one" into the spin lock 155.

If the spin lock 155 is equal to zero, it is now available to another processor. At this point the processing moves on to step 315 and a logical one is stored into the spin lock 155. Setting the spin lock 155 to logical one is an indicator that the spin lock 155 has been acquired. This makes it unavailable to another process. A copy 145 of the spin lock 155 is now brought into the L2 Cache from Main Memory 150 and the acquiring CPU now holds exclusivity to the L2 Cache. Next in step 320 the CPU can proceed to perform normal data processing routines, such as reading and/or writing whatever shared data it needed, and so forth, while it has control of the spin lock 145. Note that setting a spin lock to zero or one is an example of switching a lock "on" or "off."

Once the CPU is finished its processing, it will prepare to release the spin lock 145. In order to release the spin lock 145, in step 325 the CPU must again obtain exclusivity to the L2 Cache because a value zero must be stored into the spin lock 145 in order to release it. The holding CPU may have temporarily lost L2 Cache exclusivity because another processor may have gained exclusivity while attempting to acquire the spin lock 145. The CPU had previously held exclusivity to the L2 Cache but another CPU that is trying to acquire the spin lock (but will fail since the first CPU is still holding it) "stole" the L2 exclusivity from the first CPU. Note that acquiring a software spin lock and obtaining hardware cache exclusivity are two different processes. In order to acquire a software spin lock, i.e., store one into the spin lock, a CPU must obtain hardware cache exclusivity to the spin lock. However, having obtained hardware cache exclusivity to the spin lock does not mean that the CPU has acquired the software spin lock, unless the spin lock has value zero, i.e., it is not held by another CPU. A CPU cannot write to a spin lock without having exclusive rights to the cache where the spin lock is located. Note that two levels of exclusivity must be breached in order to have access to data. Once cache exclusivity is regained, the lock 145 is set to a logical zero in step 330. Setting the spin lock 145 to zero essentially releases it, making it available to a waiting process.

It is important to note that for both acquiring and releasing the spin lock 145, the hardware must first obtain exclusivity to the spin lock 145 in L2 Cache (330 and 335) because a value must be stored into the spin lock 145. And below we will see that it is the necessity of obtaining exclusivity to the spin lock 145 in L2 Cache for both acquiring (step 205) and releasing (step 330) the spin lock 145 that results in the locking unfairness.

We now use an example to illustrate how locking unfairness can happen, referring to both FIGS. 2 and 3. Assume that all four CPUs (115, 120, 225, and 230) on the two nodes (105 and 210) of the NUMA architecture depicted in FIG. 2 want to retrieve a shared data item (not shown) stored in Main Memory 150. To do this they will need to acquire spin lock 155, which resides in the Main Memory 150. At this point, with the spin lock 155 residing in Main Memory 150, all four CPUs will have an equal chance of acquiring the spin lock 155 since their access latency to the Main Memory 150 is the same. Let's assume that $CPU_1$ on $Node_1$ (115) succeeds in obtaining L2 Cache exclusivity to the spin lock and then acquires the spin lock 155 (setting the lock 155 to "on.") Once acquired, a copy 145 of the spin lock 155 will be brought into the $L2\ Cache_1$ 135. Now $CPU_1$ 115 holds exclusivity to the L2 $Cache_1$ 135. After $CPU_1$ 115 on $Node_1$ 105 acquires exclusivity to the cache, it can proceed to perform its data processing as shown in step 320.

Lock Ownership

During this time, the other three CPUs: $CPU_2$ 120, $CPU_3$ 225, and $CPU_4$ 230, will continue their attempts at acquiring the spin lock 155 by "spin waiting;" and either the $L2\ Cache_1$ 135 (if CPU$_2$ attempts to acquire the spin lock) or the L2 Cache$_2$ 240 (if CPU$_3$ or CPU$_4$ attempt to acquire the spin lock) may take turns to hold exclusivity to the spin lock 155. However, none of the three CPUs can acquire the spin-lock 155 since the value of the spin lock will remain at logical one before CPU$_1$ 115 releases the spin lock 155.

After CPU$_1$ 115 finishes its data processing and releases the spin lock 155 in step 330, its associated L2 Cache$_1$ 135 must first re-obtain exclusivity to the spin lock 155 in order to turn the spin lock "off" (write a zero into it). After CPU 115 obtains exclusivity and releases the spin lock 155, it does not voluntarily give up its exclusivity to the L2 Cache. This is where the unfairness is evidenced. Remember that the spin lock 155 is currently residing in L2 Cache$_1$ 135 of Node$_1$ 105 even though it has been released. This is because CPU$_1$ 115 had to re-obtain exclusivity to its cache. And keep in mind that accessing a local cache is faster than accessing a remote cache to obtain exclusivity. Therefore, regardless of which node's L2 Cache (135 or 240) has been holding exclusivity to the spin lock 145 in its attempt to acquire it during the time when CPU$_1$ 115 held the spin lock 145, now the exclusivity is back with L2 Cache$_1$ 135. Subsequently, CPU$_2$ 120 will have a higher chance of acquiring the just released spin-lock 155 than either CPU$_3$ 225 or CPU$_4$ 230. This is because the step for obtaining exclusivity to the spin lock 145 in L2 Cache (step 205) which is necessary for acquiring the spin lock 155, completes much faster for CPU$_2$ 120 than for CPU$_3$ or CPU$_4$ (225 or 230) because the L2 Cache$_1$ 135 already holds exclusivity to the spin lock 145 due to the releasing of the spin lock 155 by CPU$_1$ 115. On the other hand, for the L2 Cache$_2$ 240 to acquire exclusivity to the spin lock 145, it needs to conduct inter-node cache interrogation through Cache Coherent Hardware 180 (represented by dashed line 260), which is typically two to three times slower than acquiring exclusivity within the same L2 Cache.

The current method of spin lock exclusivity confers an advantage to the co-processors within the same node because of the current practice of a CPU not voluntarily giving up its cache exclusivity after releasing a lock.

Cooperative Feature

Figure 4:
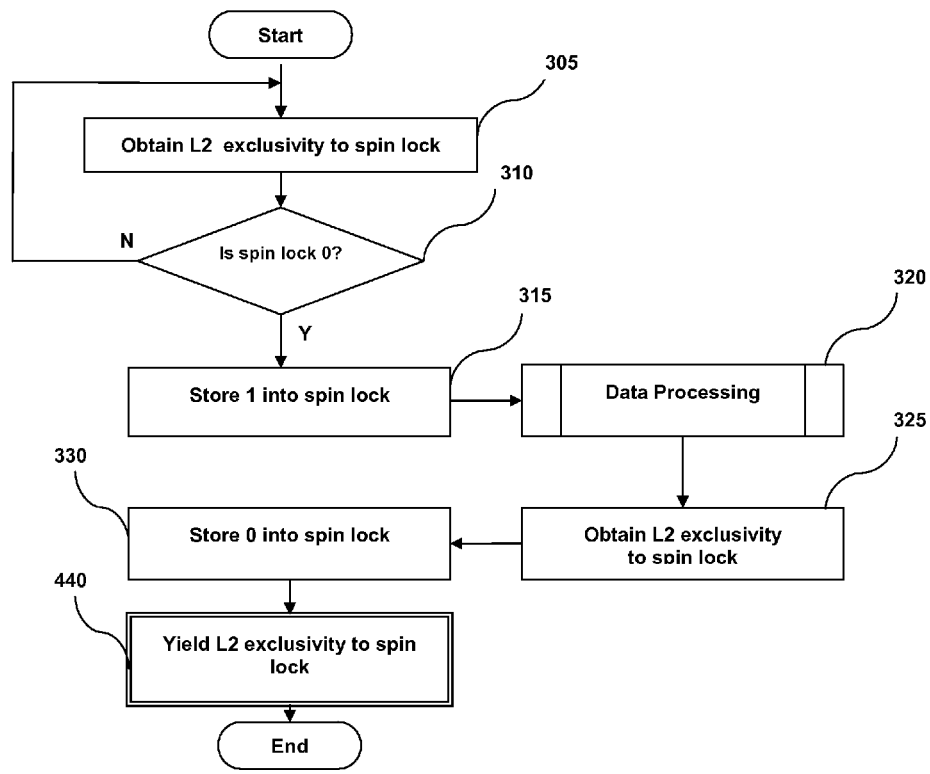
FIG. 4 is a flow chart depicting the "cooperative" feature, according to an embodiment of the present invention.

Now that it is understood why current spin locks create locking unfairness under high contention in NUMA architectures, we explain how to remove the locking unfairness using the "cooperative" feature of the present invention to resolve the problem. Refer to FIG. 4, which is almost exactly the same as FIG. 3 except an additional step (440) is shown in the shaded box after a spin lock is released by the holding CPU (step 330). From the previous section, we know that CPU$_2$ 120 has an unfair advantage of acquiring the spin lock 155 just released by CPU$_1$ 115 over CPU$_3$ or CPU$_4$ (225 or 230) because the L2 Cache$_1$ 135 already holds exclusivity to the spin lock 145 as a result of the spin lock 155 being released by CPU$_1$ 115.

The cooperative feature comes into play in step 440. After the logical zero is stored into the spin lock 155 (in step 330), the L2 Cache$_1$ 135 explicitly yields its exclusivity to the spin lock 155 by telling the cache coherent hardware to mark the L2 Cache$_1$ 135 as non-exclusive to any CPU, even though technically CPU$_2$ 115 has exclusivity to the cache. Consequently, CPU$_2$ 120 no longer has an advantage because the Level 2 cache resident in its node already holds exclusivity to the spin lock 145. Therefore, both the L2 Cache$_1$ 135 and the L2 Cache$_2$ 140 must conduct inter-cache interrogation 160 to obtain exclusivity to the spin lock 155. As a result, the other three CPUs, CPU$_2$ 120, CPU$_3$ 225, and CPU$_4$ 230, will be competing equally for acquiring the spin lock 155 just released by CPU$_1$ 115 and statistical locking fairness under high contention is achieved.

Since the cooperative feature does not require any additional lock data structure and algorithm, locking performance under low contention is preserved. In addition, no change to the current spin lock usage interface and semantics is required; therefore no change to the applications utilizing spin lock is required either.

Therefore, while there has been described what is presently considered to be the preferred embodiment, it will understood by those skilled in the art that other modifications can be made within the spirit of the invention.

I claim:

1. A method for implementing a spin lock in a system comprising a plurality of processing nodes, each node comprising at least one processor and a cache memory, the method comprising steps of:
    obtaining exclusivity to the cache memory;
    determining whether the spin lock is available;
    acquiring the spin lock upon determining that the spin lock is available;
    releasing the spin lock once processing is complete; and
    instructing cache coherent hardware in the system to mark the cache memory as non-exclusive in order to explicitly yield the exclusivity to the cache memory;
    wherein the instructing step is automatically executed after the releasing step.

2. The method of claim 1 wherein the acquiring step further comprises a step of:
    setting the spin lock to a logical state indicating its unavailability to other processors.

3. The method of claim 2 wherein the step of setting the spin lock to the logical state indicating its unavailability further comprises setting the spin lock to an integer other than zero.

4. The method of claim 1 wherein the releasing step further comprises a step of:
    setting the spin lock to a logical state indicating its availability to the other processors.

5. The method of claim 4 wherein setting the spin lock to a logical state indicating its availability to the other processors further comprises setting the spin lock to zero.

6. The method of claim 1 wherein the acquiring step further comprises steps of:
    accessing the spin lock from a main memory; and
    copying the spin lock into the cache memory.

7. The method of claim 1 wherein the releasing step further comprises a step of: reacquiring the cache memory exclusivity.

8. The method of claim 1 wherein the determining step further comprises:
    interrogating the cache memory to determine if the spin lock is set to the logical state indicating its availability to the other processors.

9. An information processing system comprising:
    a distributed shared memory multi-processor architecture comprising:

a main memory comprising a spin lock;
a plurality of nodes operatively coupled with the main memory, each node comprising:
  a plurality of processors; and
  cache memory;
cache coherent hardware shared by the plurality of nodes;
instructions for explicitly yielding exclusivity to the spin lock, wherein the instructions comprise a directive to whichever one of the plurality of processors is holding the spin lock to instruct the cache coherent hardware to mark the cache memory as non-exclusive once the spin lock is released; and
wherein the plurality of processors execute instructions to:
  obtain exclusivity to the cache memory;
  determine availability of the spin lock;
  acquire the spin lock upon determining that it is available;
  release the spin lock once processing completes; and
  explicitly yield the exclusivity to the cache memory.

10. The information processing system of claim 9 wherein the cache memory is level two cache memory.

11. The information processing system of claim 9 wherein the plurality of processors execute instructions to: set the spin lock to a logical state indicating said spin lock's unavailability to other processors.

12. The information processing system of claim 9 wherein the spin lock resides in the main memory.

13. The information processing system of claim 9 wherein the plurality of processors further execute instructions to: set the spin lock to a logical state indicating said spin lock's availability to other processors.

14. The information processing system of claim 13 wherein the logical state is zero.

15. The information processing system of claim 11 wherein the logical state is an integer other than zero.

16. The information processing system of claim 9 wherein the plurality of processors share a single cache coherent hardware.

* * * * *